Figure 2:
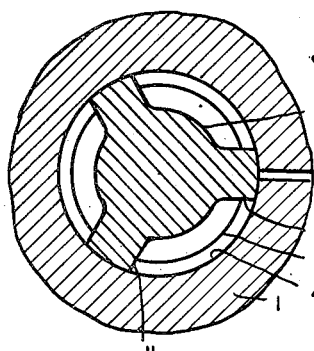

Sept. 30, 1947.        N. LESTER        2,428,315
INJECTION MOLDING MACHINE SPREADER
Filed March 20, 1944          2 Sheets-Sheet 1

INVENTOR.
NATHAN LESTER
BY
Oberlin, Limbach + Day
ATTORNEYS

Sept. 30, 1947. N. LESTER 2,428,315
INJECTION MOLDING MACHINE SPREADER
Filed March 20, 1944 2 Sheets-Sheet 2

INVENTOR.
NATHAN LESTER
BY
Oberlin, Limbach & Day
ATTORNEYS

Patented Sept. 30, 1947

2,428,315

UNITED STATES PATENT OFFICE 2,428,315

INJECTION MOLDING MACHINE SPREADER

Nathan Lester, Cleveland Heights, Ohio, assignor to Lester Engineering Company, Cleveland, Ohio, a corporation of Ohio Application March 20, 1944, Serial No. 527,206

4 Claims. (Cl. 18—30)

The present invention relates to that particular part of an injection molding or pressure casting machine wherein the material to be molded is subjected to heat and pressure to reduce it to the plasticized state, and then injected into the die or mold forming cavity. In order to reduce the cross-section of the plastic material for effecting a rapid and uniform transmission of heat throughout the body of the material, the expedient has been heretofore hit upon of inserting a spreader (otherwise sometimes known in the art as a "pineapple" or "torpedo") in the pressure cylinder. Since it is desirable to heat all of the surfaces of the injection cylinder and of the spreader in order to effect the uniform and as efficient as possible heating action upon the plastic material, designers of such injection molding machine spreaders have heretofore been confronted with the problem of how to locate a heating element within the spreader, without materially affecting the strength of the supporting elements of the spreader, as well as providing means for easily assembling, removing and replacing the heating element, as occasion arises.

Further difficulties have also been encountered by workers in this particular art with regard to designing a spreader which does not offer too great a resistance to the flow of material through the passages which it forms. Difficulty has also been encountered in properly anchoring or mounting the spreader in the injection cylinder with sufficient strength to enable it to withstand the relatively extreme pressures, on the order of 30,000 lbs. per square inch, which are exerted against it by the injection cylinder plunger and tend to detach it from its mounting in the cylinder.

My invention has for its objective, the solution and elimination of the above-mentioned problem and difficulties, and in addition to provide an injection cylinder and spreader construction which is of relatively economical and simple manufacture. Briefly outlined, I provide a spreader of hollow cylindrical form which is spaced throughout the majority of its length from the inner walls of the injection cylinder, thus presenting an annular passage of minimum resistance to flow, together with a pair of passages which make a right angle turn from such annular passage, and merge with each other into the discharge nozzle passage located in the side wall of the injection cylinder. This permits a heat element to be mounted within the spreader, and the spreader in turn to be held within the injection cylinder by means of an abutment closure plate on the outer end of the cylinder, whereby any stress or strain tending to displace the spreader from the injection cylinder is in the form of compressive rather than shearing forces.

Still another object and advantage of my invention is to be found in the provision of radial supporting legs on the inner end of the spreader thereby maintaining the proper alignment and spacing of the spreader within the cylinder and further reinforcing the strength of the spreader mounting therein.

To the accomplishment of the foregoing and related ends, said invention then comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Figure 1:
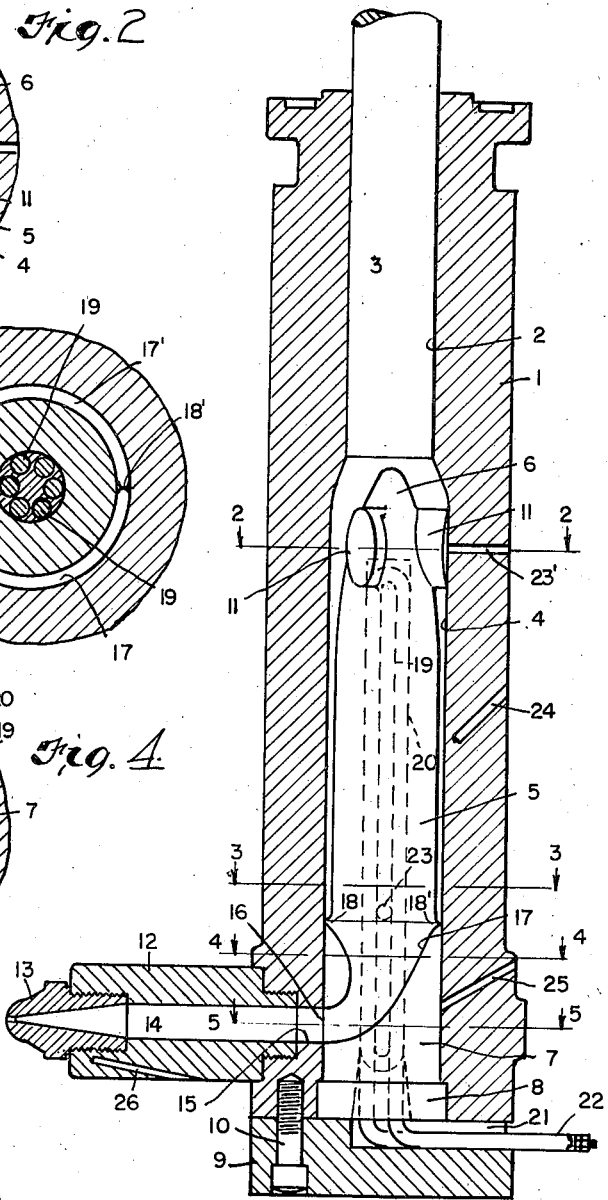
Figure 7:
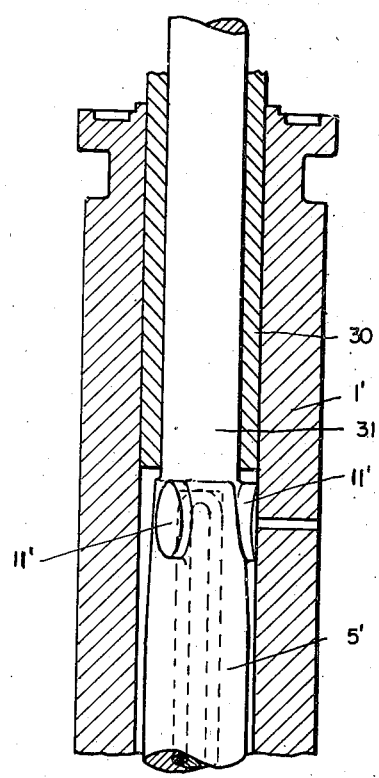
Figure 6:
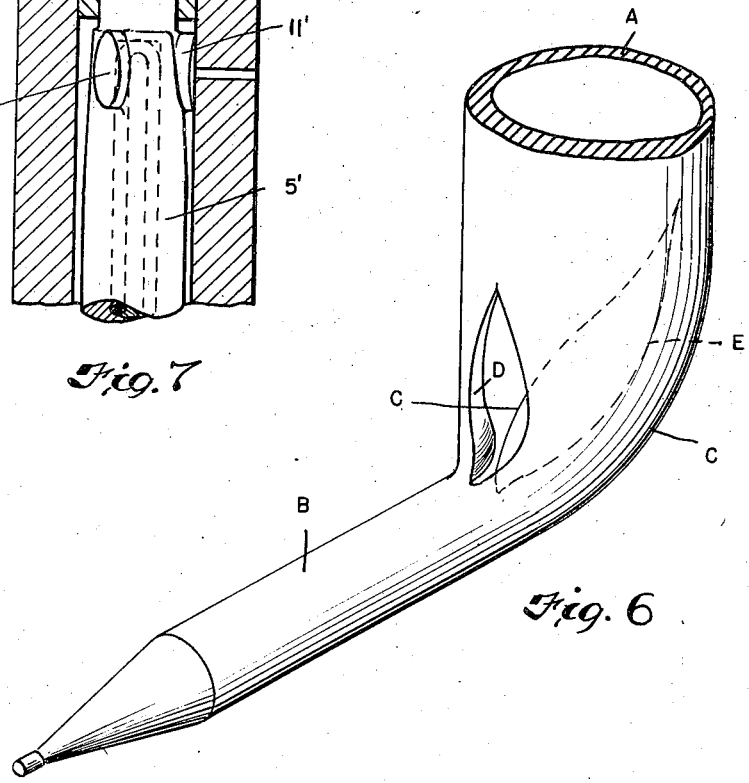

In said annexed drawings:

Fig. 1 is a sectional view taken through an injection molding cylinder and spreader embodying the principle of my invention;

Figs. 2, 3, 4 and 5 are transverse sections taken along lines 2—2, 3—3, 4—4 and 5—5, respectively, of Fig. 1;

Fig. 6 is a perspective view of the body of material alone in the lower portion of the injection cylinder and the injection nozzle, and further illustrating the conformation and shape of the material flow passages formed by the spreader and cylinder; and Fig. 7 is a partial sectional view, similar to that of Fig. 1 but showing a modified form of construction.

Now referring more particularly to the drawings, there is shown therein an injection cylinder body 1 which can suitably be assembled in an injection molding machine such as that shown and described in by prior U. S. Patent No. 2,262,615, issued November 11, 1941. The cylinder 1 has an inner bore portion 2 in which the solid plunger 3 is adapted to reciprocate. In Fig. 1, the plunger 3 is shown at the innermost point of its movement within the bore 2. The cylinder body 1 also has an enlarged bore portion 4 merging with the bore 2.

The spreader comprises a cylindrical shank portion 5 whose outer diameter is smaller than the inner diameter of the bore 4, thus forming an annular space or chamber between their respective surfaces. The inner terminal end of the shank 5 converges to bullet shape or prolate form as indicated at 6. The bottom or outer end of the spreader is in the form of a cylindrical portion 7 which has a diameter substantially equal to the inner diameter of the bore 4, and hence fits snugly therein. An annular shoulder 8 may be provided on the bottommost, or outer end of the spreader and fitted into a complementary recess in the end of the cylinder body 1. An abutment or closure plate 9 is then fastened up against the end of the cylinder 1, such as by means of the cap screws 10, and holds the spreader firmly against the injection pressure which is exerted upon it and normally tends to expel the spreader out from the end of the cylinder 1.

Radially projecting legs 11, of generally elliptical shape, the major axis of which is parallel to the axis of the cylinder bore 4, are mounted on the inner or upper end of the spreader shank 5 and fit against the cylindrical wall of the bore 4.

A discharge nozzle 12, having the nozzle fitting 13, is mounted on the side of the cylinder 1. The passage 14 in the nozzle 12 communicates with an opening 15 in the cylinder 1. This opening 15 is in alignment with the point of juncture 16 of the two converging channels or passages 17 and 17' which are formed in the surface of the cylindrical portion 7 of the spreader. As fully described in my prior Patent 2,262,615 the entire cylinder 1 with its attached parts is swingably mounted on the frame of the machine about an axis parallel to that of the cylinder so as to bring said nozzle fitting 13 into and out of operative molding position. When the nozzle fitting 13 is thus operatively positioned the lower end of said cylinder is firmly supported by a jack screw 27. When the cylinder 1 is swung so as to bring the nozzle fitting 13 out of operative molding position, the lower end thereof is clear of the jack screw 27 and other parts of the machine and is readily accessible for replacing or servicing of the spreader or of the heating element therein.

The jack screw 27 is adjustably but firmly secured to the frame of the machine and is operative to firmly support the spreader against movement and also to absorb the load caused by the pressure of the molding material within the cylinder tending to expel the spreader from therein, which load otherwise might overstress the bolts 10 which hold the plate 9 on the cylinder. The engagement between flange 8 of the spreader and the internal shoulder in the cylinder against which it bears provides a seal to prevent the molding material from creeping downwardly along the cylinder wall between the cylinder wall and the head 7 of the spreader into the passage 21 in the plate 9 and into contact with the lead wires 22 of the heating element 19.

Figure 3:
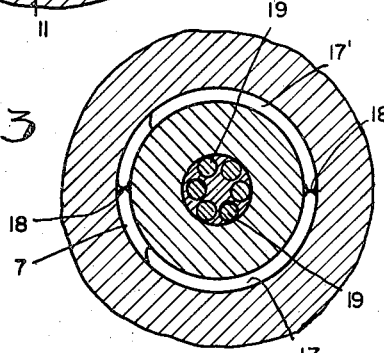
Figure 4:
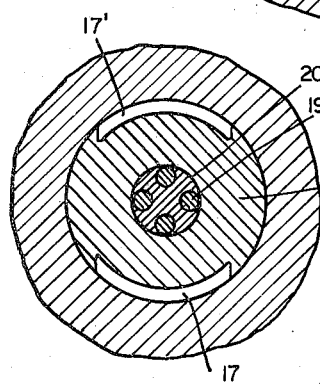
Figure 5:
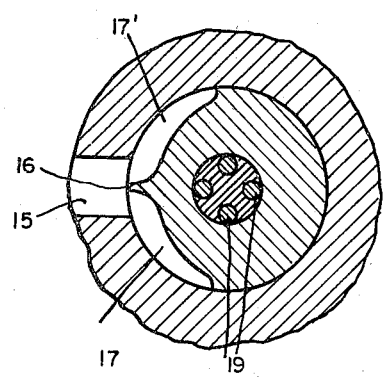

As will be seen by reference to the cross-sectional Figures 3–5, incl., the passages 17 and 17' each extend 180° around the periphery of the cylindrical portion 7, being substantially contiguous with each other at the points 18 and 18'. The thickness or depth of the passages 17 and 17' at this point is substantially equal to the thickness or depth of the space between the shank portion 5 and the cylinder bore 4. Then, as the passages 17 and 17' converge in width, they correspondingly become greater in thickness or depth until merging at the point 16.

A heating cartridge, indicated generally at 19, is inserted within the central, inner bore 20 in the spreader. It will be noted that this bore terminates at a point adjacent the ribs 11, at its inner end, and at its outer end is in communication with the slot 21 in the closure plate 9. Thus, the slot 21 accommodates the lead in wires 22 to the heating cartridge 19. Preferably, the heating cartridge 19 has a greater heating capacity in the zone corresponding to the extent of the spreader shank portion 5 (as indicated by the extra coil of heating wire at 23) than it does in the remaining portion of the spreader.

The cylinder 1 is, of course, heated in the customary manner by an electric, oil or steam, heating jacket. Thermocouple holes are provided at 23', 24, 25 and 26 for determining and aiding in the control of the temperatures maintained at the respective zones along the path of flow of the material through the injection cylinder.

The conformation of the material flow passages formed by the above-described spreader and injection cylinder structure is further illustrated in Fig. 6. Thus, the portion A represents the annular space between the shank portion 5 and the cylinder bore 4. The portion B represents the discharge passage 14. The portions CC represent the conformation of material in the passages 17 and 17', and the open portions D and E are those which are occupied by the cylindrical portion 7 of the spreader in which the passages 17 and 17' are formed. Thus, it will be seen that the material has a minimum impedance or resistance placed in its path, in its flow from its full, relatively thin cross-sectional form A, to its final discharge from the nozzle portion B.

In the modified form of construction shown in Fig. 7, an annular plunger 30 is employed in the cylinder 1', in place of the solid plunger 3. In this instance, the spreader shank portion 5' does not terminate just above the supporting ribs 11' (or alternatively just below the point of innermost travel of the plunger), but extends, in the form of the cylindrical portion 31, into the hollow interior of the plunger 30. The lower or remaining portion of the spreader 5' and of the cylinder 1', of course, remains the same as previously described in connection with Figs. 1–6, inclusive.

It will thus be seen that the spreader constructed according to my above-described invention can be relatively simply and economically made in the form of a single piece of metal, and that it does not require the relatively expensive and time-consuming machining methods involved in the drilling of a plurality of small bores and internal passages. All of the material contacting surfaces in my spreader can be machined and formed by exterior operations.

Other modes of applying the principle of the invention may be employed, change being made as regards the details described, provided the features stated in any of the following claims or the equivalent of such be employed.

I therefore particularly point out and distinctly claim as my invention:

1. The combination with the injection cylinder of a pressure molding machine, such cylinder having a lateral discharge opening adjacent one end thereof, of a spreader comprising a head closely fitted within such cylinder end and extending to a point beyond such opening and a shank of smaller diameter than the bore of said cylinder projecting from said head into the latter, said head being formed with plural channels leading from the space between said shank and cylinder bore to such discharge opening, such channels being of progressively decreasing width toward such discharge opening and the portions thereof of minimum width being substantially equal to the diameter of and in register with such discharge opening.

2. The combination with the injection cylinder of a pressure molding machine, such cylinder having a lateral discharge opening adjacent one end thereof, of a spreader comprising a head closely fitted within such cylinder end and extending to a point beyond such opening and a shank of smaller diameter than the bore of said cylinder projecting from said head into the latter, said head being formed with plural channels leading from the space between said shank and cylinder bore to such discharge opening, such channels being of progressively decreasing width and increasing depth toward such discharge opening and the portions thereof of minimum width being substantially equal to the diameter of and in register with such discharge opening, such increasing depth of the channels compensating for the decrease in the cross-section areas thereof by the decreasing width thereof.

3. The combination with the injection cylinder of a pressure molding machine, such cylinder having a lateral discharge opening adjacent one end thereof, of a spreader comprising a head closely fitted within such cylinder end and extending to a point beyond such opening and a shank of smaller diameter than the bore of said cylinder projecting from said head into the latter, said head being formed with plural channels leading from the space between said shank and cylinder bore to such discharge opening, such channels being symmetrical about the longitudinal axis of the spreader for a portion of their extent and of progressively decreasing width toward such discharge opening and the portions thereof of minimum width being substantially equal to the diameter of and in register with such discharge opening.

4. The combination with the injection cylinder of a pressure molding machine, such cylinder having a lateral discharge opening adjacent one end thereof, of a spreader comprising a head closely fitted within such cylinder end and extending to a point beyond such opening and a shank of smaller diameter than the bore of said cylinder projecting from said head into the latter, said head being formed with plural channels leading from the space between said shank and cylinder bore to such discharge opening, such channels being of progressively decreasing width toward such discharge opening and the portions thereof of minimum width being substantially equal to the diameter of and in register with such discharge opening, said head being formed with a radial fin opposite such discharge opening for diverting the flow of molding material from such channels directly into such discharge opening.

NATHAN LESTER.

REFERENCES CITED

The following references are of record in the file of this patent:

UNITED STATES PATENTS

| Number | Name | Date |
| --- | --- | --- |
| 2,202,140 | Burroughs | May 28, 1940 |
| 2,308,867 | Dinzl | Jan. 19, 1943 |
| 2,309,496 | Bird et al. | Jan. 26, 1943 |
| 2,309,943 | Ernst | Feb. 2, 1943 |
| 1,939,041 | Cherry | Dec. 12, 1933 |